United States Patent [19]

Lefferts et al.

[11] Patent Number: 5,013,002

[45] Date of Patent: May 7, 1991

[54] ELASTOMERIC CLAMP

[75] Inventors: Scott R. Lefferts, Huron; Dennis J. Stelzer, Sr., Milan; Thomas V. Weisenberger, Norwalk, all of Ohio

[73] Assignee: The Pullman Company, Livingston, N.J.

[21] Appl. No.: 509,092

[22] Filed: Apr. 16, 1990

[51] Int. Cl.⁵ ............................................. F16L 3/08
[52] U.S. Cl. ................................. 248/74.1; 248/74.5; 248/635
[58] Field of Search ............... 248/74.1, 74.2, 74.4, 248/74.5, 65, 635, 71; 285/61, 62; 174/163 R, 164, 163 F; 24/20 R, 20 E, 457, 458

[56] References Cited

U.S. PATENT DOCUMENTS

| | | | |
|---|---|---|---|
| 1,527,346 | 2/1925 | Brady | 248/74.5 X |
| 2,447,251 | 8/1948 | Huette | 174/166 R |
| 2,683,578 | 7/1954 | Rainey | 174/163 R X |
| 2,688,655 | 9/1954 | Gross | 174/164 |
| 2,727,089 | 12/1955 | Cuccaro | 174/164 |
| 2,912,199 | 11/1959 | Breisch | 248/74.1 |
| 3,246,076 | 4/1966 | Stoneburner | 174/164 X |
| 3,498,575 | 3/1970 | Downing | 248/74.1 X |
| 4,155,530 | 5/1979 | Oguni | 248/74.1 |
| 4,790,502 | 12/1988 | Saegusa | 24/20 R X |

FOREIGN PATENT DOCUMENTS

| | | | |
|---|---|---|---|
| 2280013 | 2/1976 | France | 248/74.1 |
| 8001506 | 7/1980 | World Int. Prop. O. | 174/166 R |

Primary Examiner—J. Franklin Foss
Attorney, Agent, or Firm—John G. Gilfillan, III

[57] ABSTRACT

An elastomeric clamp for securing an associated tubular member to another object and for isolating and dampening vibration comprises upper and lower elastomeric portions. The upper and lower elastomeric portions are joined at one end by an elastomeric hinge and near the other end by a closure means. An associated tubular member is compressively received within the opposing faces of the upper and lower elastomeric portions. The compressive force provided by the closure means deforms the elastomeric upper and lower portions about the tubular member, providing improved vibration isolation through the elastomeric nature of the upper and lower portions and hinge.

5 Claims, 4 Drawing Sheets

1

ELASTOMERIC CLAMP

FIELD OF THE INVENTION

This invention pertains to the art of clamps for clamping a first member to a second object or member, and more particularly, to an elastomeric clamp with improved vibration isolation qualities.

DESCRIPTION OF THE RELATED ART

One common use of clamps is to secure a fuel line to an aircraft engine. One of the functions of such a clamp is to isolate the fuel line from vibrations associated with the aircraft engine. One clamp design which is currently used on aircraft engines is made from an anodized aluminum material and provides little or no compressive force or interference between the clamp and the fuel line. Because of the stiffness of aluminum and its associated low vibration damping characteristics, this clamp also provides little or no vibration isolation. Other fuel clamp designs have featured a mechanical hinge.

The present invention contemplates a new and improved elastomeric clamp which is simple in design and overcomes the foregoing difficulties and others while providing better and more advantageous overall results.

SUMMARY OF THE INVENTION

In accordance with the present invention, a new and improved elastomeric clamp is provided which more effectively secures the fuel line to the aircraft engine and isolates the fuel line from vibration.

More particularly, in accordance with the invention, the clamp includes an upper portion having an inner and outer face. The inner face of the upper portion has a first upper void operatively adapted to receive approximately one-half of the circumference of an associated tubular member. A lower portion also has an inner and outer face, the inner face of the lower portion having a first lower void operatively adapted to receive approximately one-half of the circumference of an associated tubular member. The inner faces of the upper and lower portions are opposed. A hinge connects one end of the upper portion to one end of the lower portion. Closure means is provided for closing the upper and lower portions about the associated tubular member and creating compressive force on the associated tubular member.

In accordance with another aspect of the invention, the upper and lower portions are made of an elastomer.

According to another aspect of the invention, the closure means is an associated bolt and nut.

According to a further aspect of the invention, the clamp includes an upper sleeve which is received in a hole in the upper portion and a lower sleeve which is received in a hole in the lower portion. The lower sleeve is aligned with the upper sleeve to receive an associated bolt.

According to another aspect of the invention, the first upper void and the first lower void are positioned relative to each other to create a space to receive the associated tubular member. The space created thereby in the totally closed position is slightly smaller than the associated tubular member in order to provide compressive force on the tubular member.

According to another aspect of the invention, the upper and lower portions in the hinge are operatively adapted to be normally closed.

According to another aspect of the invention, the clamp includes an upper plate which is fixedly attached to the outer face of the upper portion. The upper plate is made of stainless steel. A lower plate is fixedly attached to the outer face of the lower portion and is also made of stainless steel.

According to another aspect of the invention, the upper and lower sleeves are bonded to the elastomer in direct contact with them.

According to another aspect of the invention, the upper sleeve and the upper plate are one piece and the lower sleeve and the lower plate are also one piece.

According to another aspect of the invention, the clamp includes a second upper void and a second lower void. The second upper and lower voids are operatively adapted to compressively receive a second associated tubular member.

According to another aspect of the invention, an elastomeric hinge connects one end of the upper portion to one end of the lower portion.

According to another aspect of the invention, the clamp comprises an elastomeric upper portion which has an inner and outer face. An elastomeric lower portion also has an inner and outer face. The inner faces of the upper and lower portions are opposed and receive therebetween an associated tubular member. An elastomeric hinge joins one end of the upper portion to one end of the lower portion. A closure means closes the clamp about the associated tubular member in a compressive manner, the upper and lower portions elastically deforming about the associated tubular member.

One advantage of the present invention is that the elastomeric hinge provides additional vibration isolation as compared to a mechanically fastened hinge.

Another advantage of the invention is that the elastomeric hinge allows for an integral, one-piece, chemically-bonded design which essentially eliminates the possibility of disassembly during use.

Another advantage of the present invention is that the elastomeric hinge allows for equal stress distribution even under severely deformed conditions, whereas the conventional mechanical hinge cannot accept large lateral deformations.

Another advantage of the present invention is that the use of an elastomer as the primary hinge material eliminates any corrosion of the hinge.

Another advantage of the invention is that regardless of the fuel line profile and material, and providing that the fuel line dimensions follow the normal tolerances, the elastomeric hinge and clamp profile give positive compression and vibration attenuation to the fuel line.

Another advantage of the present invention is that the contour of the elastomer which is in contact with the fuel line provides compression on the fuel line at all times.

Another advantage of the present invention is that the compression on the fuel line eliminates any gapping which may occur under maximum deflection conditions, which, in turn, increases the durability of the clamp.

Another advantage of the present invention is that the compression supplied by the clamp increases fuel line stability by increasing the force required to displace the tube.

Another advantage of the present invention is that the elastomeric hinge provides ease of manufacturing by eliminating the need for excess assembly operations after molding, such as welding, forming, or assembly.

Still other benefits and advantages of the invention will become apparent to those skilled in the art upon a reading and understanding of the following detail specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
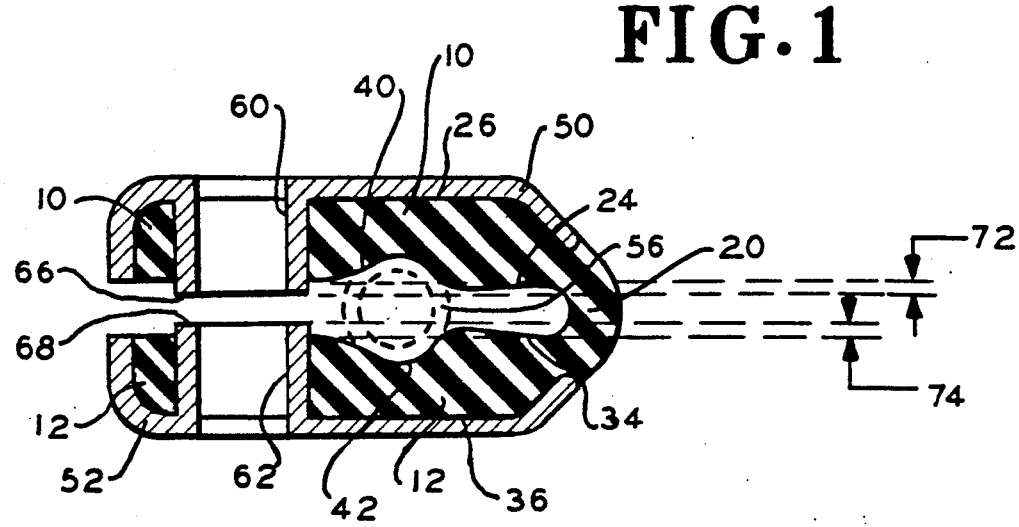
FIG. 1 is a side cross-sectional view of a clamp according to the present invention.
Figure 2:
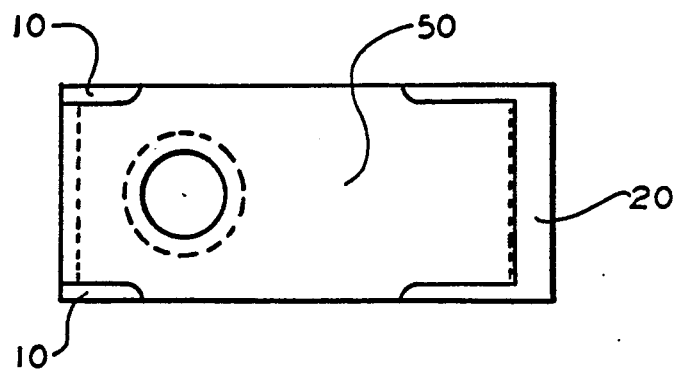
FIG. 2 is a plan view of the clamp of FIG. 1.

Referring now to the drawings, wherein the showings are for purposes of illustrating preferred embodiments of the invention only and not for purposes of limiting same, FIGS. 1 and 2 show an elastomeric clamp according to the present invention. An upper portion 10 is connected to a lower portion 12 by a hinge 20. In the preferred embodiment, the upper portion 10, lower portion 12, and hinge 20 are all made of an elastomer. The term "elastomer" is meant to include all polymers. In accordance with the invention, it is desirable to use an elastomer having sufficient strength and compression characteristics. One particularly useful elastomer for this invention is one that exhibits compression set of about 10% or less. An example of such an elastomer is Viton, a registered trademark of Dupont Corporation, which is a synthetic fluorocarbon elastomer.

The upper portion 10 has an inner face 24 and an outer face 26. Likewise, the lower portion 12 has an inner face 34 and an outer face 36. A first upper void 40 is formed into the inner face 24 of the upper portion 10. Likewise, a first lower void 42 is formed into the inner face 34 of the lower portion 12. The first upper void 40 and the first lower void 42 are aligned so that they together create a generally circular space having a radius of curvature slightly less than that of an associated tubular member 56 to be clamped. The first upper void 40 and the first lower void 42 work together to receive the associated tubular member 56 and secure it to an associated object (not shown). These voids 40,42 are shown to have a generally smooth surface, but in certain applications it may be desirable to have a ribbed or irregular/interrupted surface to supply better vibration isolation.

Figure 3:
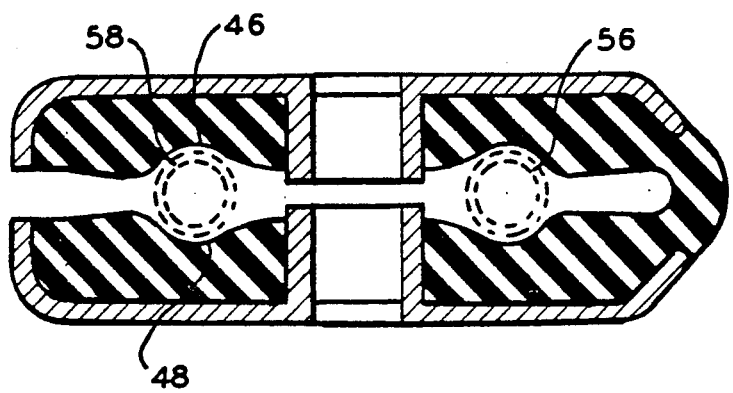
FIG. 3 is a side cross-sectional view of an alternate embodiment of the present invention.
Figure 6:
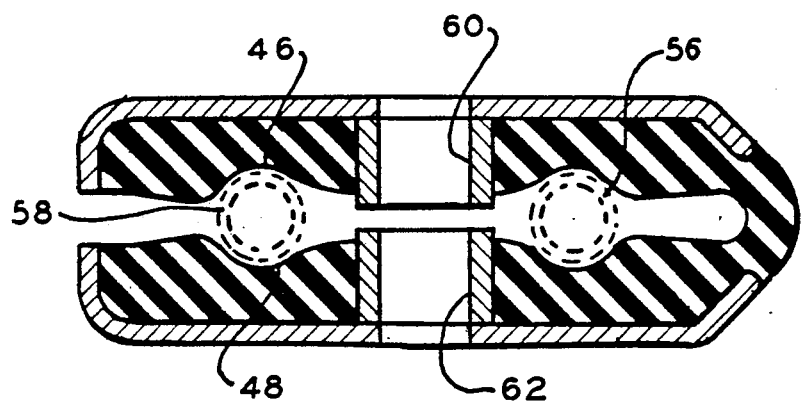
FIG. 6 is a side cross-sectional view of another embodiment of the clamp of the present invention.

In the alternate embodiment shown in FIGS. 3 and 6, a second upper void 46 and a second lower void 48 are operatively adapted to receive a second associated tubular member 58. It is within the scope of this invention to include a clamp having matching additional upper and lower voids to receive any number of associated tubular members of the same or different sizes.

Figure 4:
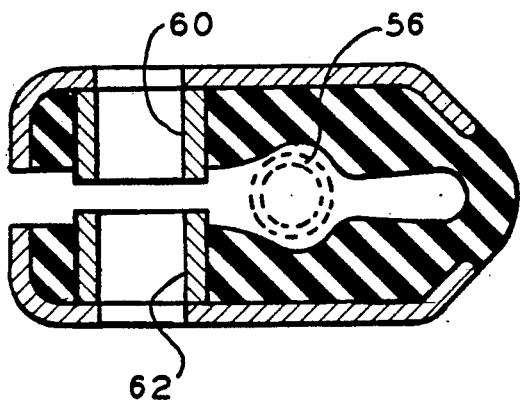
FIG. 4 is a side cross-sectional view of another embodiment of a clamp according to the present invention.
Figure 5:
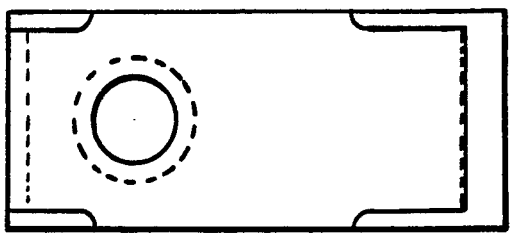
FIG. 5 is a plan view of the clamp of FIG. 4.

With reference to FIGS. 1 and 2, an upper plate 50 is fixedly attached to the outer face 26 of the upper portion 10. Likewise, a lower plate 52 is fixedly attached to the outer face 36 of the lower portion 12. In the preferred embodiment, the upper plate features an upper sleeve 60 which extends from and is an integral part of the upper plate 50. Likewise, the lower plate 52 has a lower sleeve 62 which extends from and is an integral part of the lower plate 52. On the embodiments illustrated in FIGS. 4 and 6, the sleeves 60, 62 are separate pieces from the upper plates 50, 52 which are chemically bonded to the elastomer in direct contact therewith. However, the embodiment which is shown in FIG. 1 and FIG. 3 is presently preferred due to ease of assembly.

The sleeves 60, 62 are aligned to receive an associated bolt (not shown). The associated bolt, along with an associated nut, or a threaded insert, forms a closure means for closing the clamp about the associated tubular member 56. Although the clamp is molded in a "normally closed" shape, the closure means is required to secure the associated tubular member 56 within the clamp and provide additional compressive force.

The fact that the upper portion 10 and lower portion 12 of the clamp are manufactured of an elastomer provides for the vibration isolation and damping characteristics of the clamp. The upper and lower portion 10, 12 elastically deform upon closure of the clamp about the associated tubular member 56. The compressive force supplied to the tubular member 56 by the deformation of the upper and lower portion 10, 12 of the clamp result in improved vibration dampening as well as a longer life clamp. The hysteresis losses of the elastomer contributes to the dampening of the vibration energy. The fatigue properties of the elastomer are improved by maintaining the clamp in a state of constant compression.

Further, the elastomeric hinge 20 further provides dampening characteristics beyond that available with a mechanical hinge. Lateral loading of the fuel line along the length of the fuel line is not uncommon. The elastomeric hinge 20 is able to deflect and minimize stress under such conditions, contrary to the capabilities of a more conventional mechanical hinge.

With continuing reference to FIG. 1, the distance between the interior edge 66 of the upper sleeve 60 and the interior edge 68 of the lower sleeve 62 is determined by the amount of deflection anticipated in the associated tubular member 56. For example, if the maximum deflection expected in the upper direction is .030 inch and the maximum deflection expected in the lower direction is 0.030 inch, the interior edge 66 of the upper sleeve 60 should be 0.060 inch from the interior edge 68 of the lower sleeve 62. That is, so long as the tube deflection is less than 0.030 in either direction, the tube wall will always be held in compression.

In the preferred embodiment, the upper plate 50 and lower plate 52 are made of a strong generally non-corrosive material, such as stainless steel, high strength plastic, etc. A bolt and nut, and/or threaded insert, are used as the closure means. The upper and lower plates 50, 52 are bonded to the outer faces 26, 36 of the upper and lower portions 10, 12 via a commercially available adhesive. Any adhesive which is appropriately chosen by applying sound engineering principles to the conditions of the application should be effective.

The elastomeric upper portion 10 and lower portion 12, as well as the hinge 20, can be transfer molded or injection molded. The inventors perceive injection molding to be the preferred production method. By design, the inner face 24 of the upper portion 10 does not quite extend to the interior edge 66 of the upper sleeve 60. Instead, a small gap 72 is created. Likewise, the inner face 34 of the lower portion 12 does not quite extend to the interior edge 68 of the lower sleeve 62, creating a gap 74. The gaps 72, 74 are created to insure none of the elastomeric upper or lower portions 10, 12 flows between the interior edges 66, 68 of the sleeves 60, 62.

The invention has been described with reference to a preferred embodiment. Obviously, modifications and alterations will occur to others upon a reading and understanding of this specification. It is intended to include all such modifications and alterations insofar as they come within the scope of the appended claims or the equivalence thereof.

Having thus described the invention, it is now claimed:

1. A clamp for securing an associated tubular member, such as a gas line, to another object and isolating the fuel line from vibrations emanating from the object, the clamp comprising:
    an upper elastomeric portion having an inner and outer face, the inner face of the upper portion having a first upper void operatively adapted to receive approximately one-half of the circumference of an associated tubular member;
    a lower elastomeric portion having an inner and outer face, the inner faces of the upper and lower portions being opposed, the inner face of the lower portion having a first lower void operatively adapted to receive approximately one-half of the circumference of the associated tubular member;
    an elastomeric hinge means connecting one end of the upper portion to one end of the lower portion;
    an upper sleeve which is received in a hole in the upper portion;
    a lower sleeve which is received in a hole in the lower portion, said lower sleeve aligned with the upper sleeve;
    an upper resilient plate fixedly attached to the outer face of the upper portion;
    a lower resilient plate fixedly attached to the outer face of the lower portion; and
    closure means received in said upper and lower sleeves for totally closing upper and lower portions about the associated tubular member and creating compressive force on the associated tubular member; said closure means in clamping engagement not allowing for disengagement of the tubular member.

2. The clamp of claim 1, wherein the first upper void and first lower void are positioned relative to each other to create space to receive the associated tubular member, the space thereby created having a generally circular shape and a radius of curvature less than the associated tubular member.

3. The clamp as in claim 1 wherein the upper and lower portions and the hinge are operatively adapted to be normally closed.

4. The clamp as in claim 1, wherein the upper sleeve and the upper plate are one piece, and the lower sleeve and lower plate are one piece.

5. The clamp as in claim 1, further comprising:
    a plurality of upper voids; and
    a plurality of lower voids, the plurality of upper voids and plurality of lower voids operatively adopted to compressively receive a plurality of associated tubular members.

* * * * *